United States Patent [19]

Jung

[11] Patent Number: 5,963,629
[45] Date of Patent: Oct. 5, 1999

[54] METHOD FOR EMBODYING AUTOMATIC CALL IN A KEYPHONE SYSTEM

[75] Inventor: Tae-Hyun Jung, Gumi, Rep. of Korea

[73] Assignee: Samsung Electronics Co., Ltd., Paldal-ku, Rep. of Korea

[21] Appl. No.: 08/867,688

[22] Filed: Jun. 2, 1997

[30] Foreign Application Priority Data

May 31, 1996 [KR] Rep. of Korea .................... 96/19234

[51] Int. Cl.⁶ .................................................. H04M 1/00
[52] U.S. Cl. .......................... 379/156; 379/159; 379/158
[58] Field of Search .................................. 379/156, 157, 379/161, 164, 165, 166, 182, 183, 93.09, 100.05, 158, 159, 160

[56] References Cited

U.S. PATENT DOCUMENTS

| 3,936,613 | 2/1976 | Nishigori et al. |
| 4,113,991 | 9/1978 | Gorham et al. |
| 4,291,199 | 9/1981 | Densmore et al. ................. 379/156 |
| 4,665,545 | 5/1987 | Galensky et al. .................. 379/158 |
| 5,151,933 | 9/1992 | Kazuyuki .......................... 379/159 |
| 5,153,908 | 10/1992 | Kakizawa et al. |
| 5,187,736 | 2/1993 | Moriozumi ..................... 379/100.05 |
| 5,216,708 | 6/1993 | Furukawa et al. ................ 379/165 |
| 5,260,986 | 11/1993 | Pershan . |
| 5,544,237 | 8/1996 | Bales et al. . |
| 5,787,155 | 7/1998 | Luna ............................. 379/93.09 |
| 5,838,778 | 11/1998 | Jung .................................. 379/182 |
| 5,838,784 | 11/1998 | Yu ..................................... 379/356 |

Primary Examiner—Curtis A. Kuntz
Assistant Examiner—Rexford N. Barnie
Attorney, Agent, or Firm—Robert E. Bushnell, Esq.

[57] ABSTRACT

A method for embodying an automatic call during an idle state. The method for embodying the automatic call in a keyphone system, where an extension number of counterpart's keyphone for automatic call is registered in correspondence with a keyphone system capable of embodying the automatic call, thereby connecting the automatic call upon the two keyphones under the idle state.

20 Claims, 4 Drawing Sheets

| | WHETHER OR NOT KEYPHONE SYSTEM CAN EMBODY AUTOMATIC CALL | EXTENSION NUMBER OF KTS |
|---|---|---|
| KTS 0 | 1 | KTS7 |
| KTS 1 | 1 | |
| KTS 2 | 0 | |
| ⋮ | | |
| KTSn-1 | 0 | |
| KTSn | 1 | KTS23 |

Fig. 4

METHOD FOR EMBODYING AUTOMATIC CALL IN A KEYPHONE SYSTEM

CLAIM OF PRIORITY

This application makes reference to, incorporates the same herein, and claims all benefits accruing under 35 U.S.C. §119 from an application for Method For Embodying Automatic Call in a Keyphone System earlier filed in the Korean Industrial Property Office on May 31, 1996 and there duly assigned Ser. No. 19234/1996.

FIELD OF THE INVENTION

The present invention relates to a method for embodying an automatic call in a keyphone system, and in particular, to a method for constantly connecting calls between keyphones during an idle state through connecting a pair of keyphones capable of embodying the automatic call therebetween.

BACKGROUND OF THE INVENTION

In prior art keyphone systems, when users frequently call for business or conduct their business in conference with one another, they are required to interrupt other extension subscribers' calls because the line is busy for a long time or it is necessary for users to dial whenever assistance for business arises.

As stated above, when the users must frequently call for business, the prior art keyphone systems provide the users with inconvenience to dial one by one whenever to call as well as to interrupt the other extension subscribers' calls because the line is busy for a long time.

U.S. Pat. No. 5,260,986 for a Group Notification Service and System to Pershan discloses a method of using a public switched telecommunications network to deliver to designated persons a message. U.S. Pat. No 5,544,237 for an Automatic Conference Initiation Upon All Telephones for the Conference being Idle to Bales et al. Discloses telephone terminals that initiate the conference feature. U.S. Pat. No. 5,153,908 for an Automatic Redial in a Key Telephone System Having Different Line Types to Kakizawa et al. Discloses idle outside lines selected and acquired in accordance with the order of preference.

What is needed is a method for automatically calling telephones in a telephone system. The extension number of the telephone to be called is stored in a register and then automatically called.

SUMMARY OF THE INVENTION

It is therefore an object of the present invention to provide a method for embodying an automatic call during an idle state.

It is another object of the present invention to provide a method for cutting off an automatic call when other functions in a keyphone system must be used during the automatic call.

To achieve the above objects, the present invention provides a method for embodying an automatic call in a keyphone system, wherein an extension number of a counterpart's keyphone system for an automatic call is registered in correspondence with the keyphone system capable of embodying the automatic call, thereby connecting the automatic call upon the two keyphone systems when in an idle state.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a diagram illustrating the construction of a memory according to an embodiment of the present invention.

DETAILED DESCRIPTION OF THE INVENTION

Figure 1:
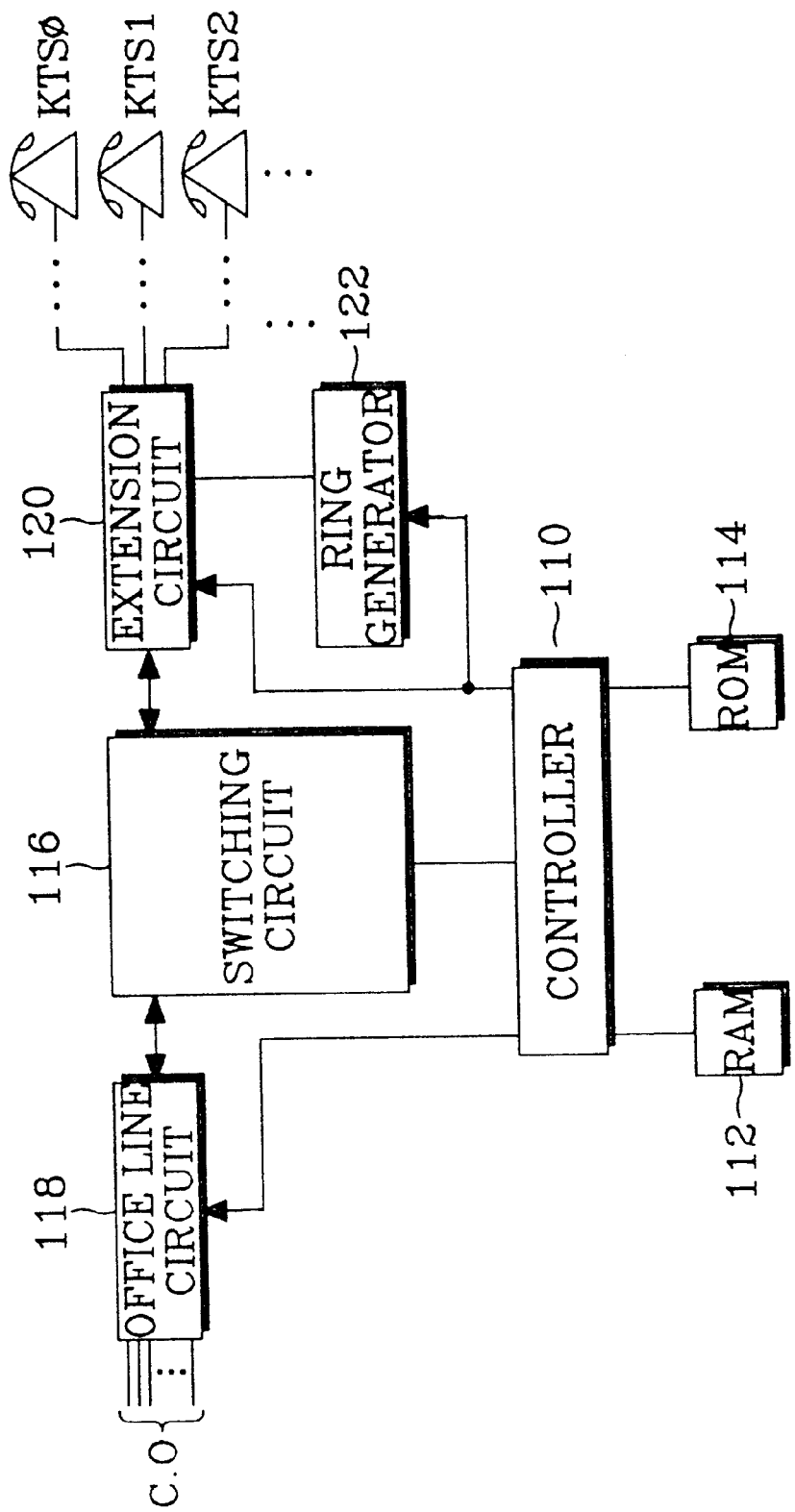
FIG. 1 is a block diagram illustrating the construction of a keyphone system according to an embodiment of the present invention.

Turning to the figures, FIG. 1 is a block diagram illustrating the construction of a keyphone system according to an embodiment of the present invention. As shown in FIG. 1, a controller 110 controls the overall operations of the keyphone system according to program set up in a random access memory (hereinafter, referred as to RAM) 112. The RAM 112 stores an initial program and an operational program for the controller 110. A read only memory (hereinafter, referred as to ROM) 114 stores an extension number according to performance of the exchange function and data generated as a result of the performance of the exchange function. A switching circuit 116 performs the switching operation under the control of the controller 110. Under the control of the controller 110, an office line circuit 118 connects a plurality of the office lines inputted from a public exchange system (not shown) to the switching circuit 116. Under control of the controller 110, an extension circuit 120 connects a plurality of extension terminals to the switching circuit 116. Under the control of the controller 110, a ring generator 122 transmits a ring when the request of call arises from the office line circuit 118 or the extension circuit 120 to a specific extension terminal.

Figure 2:
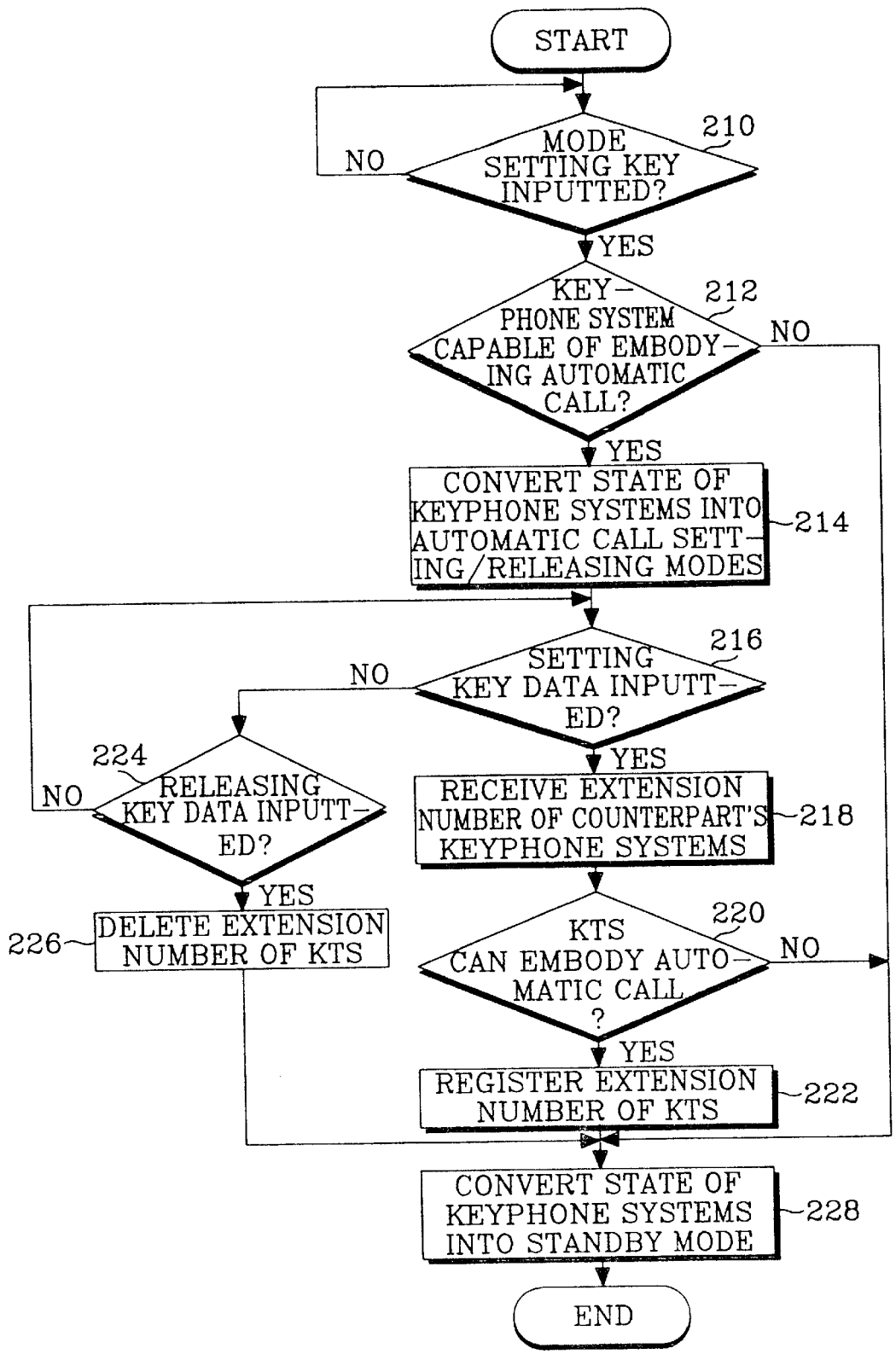
FIG. 2 is a control flow chart illustrating steps for setting and releasing an automatic call according to an embodiment of the present invention.

FIG. 2 is a control flow chart illustrating steps for setting or releasing the automatic call according to an embodiment of the present invention, which is made up of the steps of when a key requiring conversion to an automatic call mode is inputted from the keyphone system capable of embodying the automatic call, converting the state of the keyphone system into automatic call setting or releasing mode; when a setting key is inputted from the keyphone system after conversion to the automatic call setting or releasing modes, receiving and registering an extension number of a counterpart's keyphone system capable of embodying the automatic call and then, converting the state of the keyphone system into a standby mode; and, when a releasing key is inputted from the keyphone system after conversion to the automatic call setting or releasing modes, deleting the registered extension number of the counterpart's keyphone system and then, converting the state of the keyphone system into the standby mode.

Figure 3:
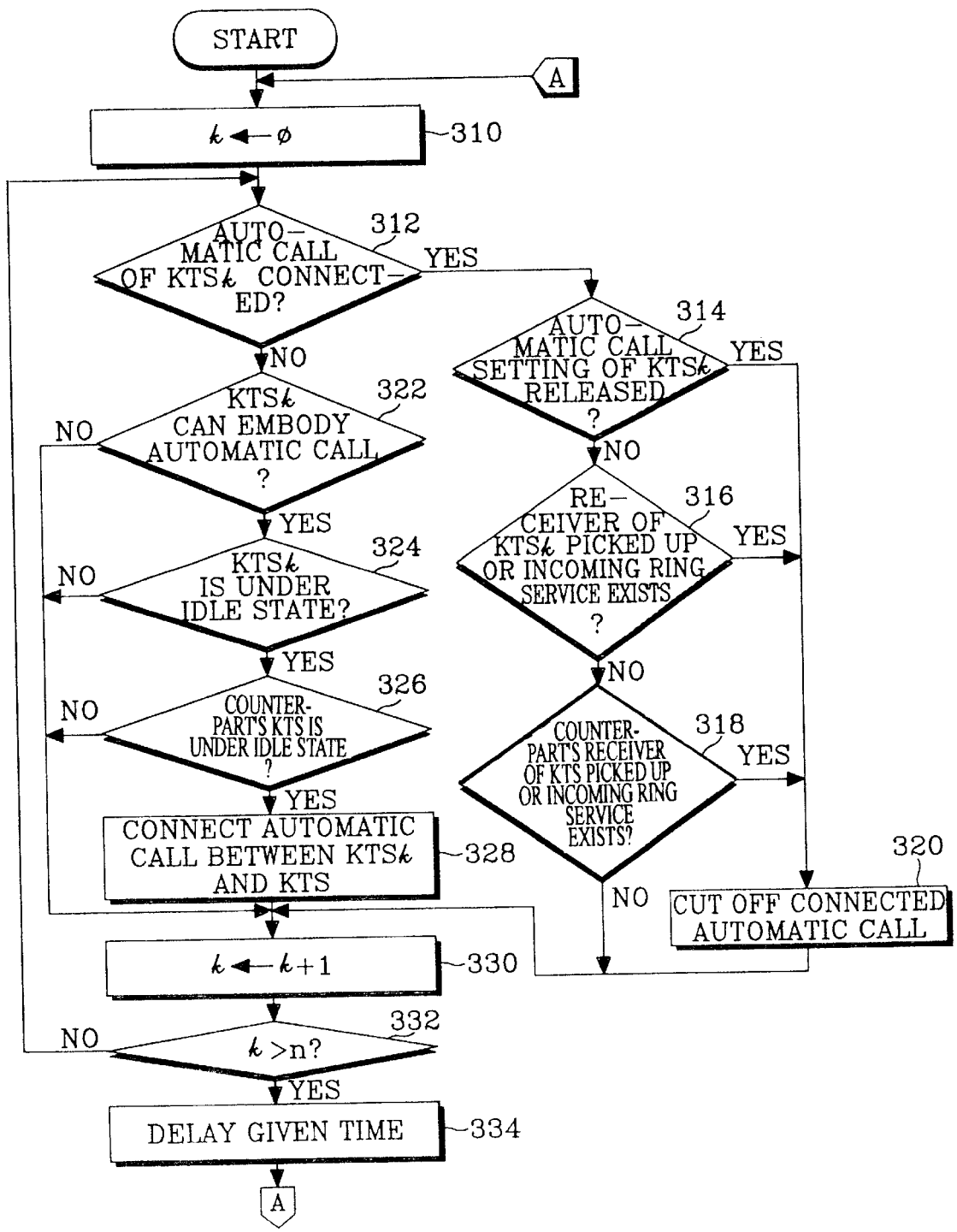
FIG. 3 is a control flow chart illustrating steps for connecting and cutting off an automatic call according to an embodiment of the present invention.

FIG. 3 is a control flow chart illustrating steps for connecting and cutting off the automatic call according to an embodiment of the present invention, which is made up of the steps of checking whether or not an automatic call setting of the keyphone system is released in condition of connection of the automatic call thereof; checking whether or not a receiver of the keyphone system or the counterpart's keyphone system is picked up or whether or not an incoming ring exists in condition of connecting the automatic call of the keyphone system; when the automatic call setting was released or when the receiver of the keyphone system or the counterpart's keyphone system was picked up or the incoming ring existed, cutting off the connected automatic call; and, when the keyphone system and the counterpart's keyphone system are in an idle state in condition of not connecting the automatic call of the keyphone system capable of embodying the automatic call, connecting the automatic call. The automatic call connecting and cutting off modes are sequentially used to a plurality of the keyphone systems. If completing usage of the above modes to all of the keyphone systems, the automatic call connecting and cutting off modes are again performed in the keyphone system after delaying a given time.

FIG. 4 is a diagram illustrating the construction of a memory according to an embodiment of the present invention, comprising a domain for storing data indicating whether or not the keyphone system can embody the automatic call; and, a domain for storing the extension number of the counterpart's keyphone system (KTS) to connect the automatic call during the automatic call mode. When "1" is set in the domain indicating whether or not the keyphone system can embody the automatic call, it can be seen therefrom that the automatic call is capable of being embodied by the keyphone system. Also, when "0" is set in the above domain, it can be seen therefrom that the automatic call is incapable of being embodied by the keyphone system.

Now, another preferred embodiment of the present invention will be described in detail with reference to the accompanying drawings. Firstly, referring to FIG. 2, the controller 110 senses in step 110 whether or not a mode setting key is inputted. The mode setting key is key data requiring to set or release the automatic call mode inputted from the keyphone systems KTS0–KTSn. Further, when sensed in the step 210 that the key data was inputted therefrom, the controller 110 proceeds to step 212. But, when sensed therein that the key data was not inputted therefrom, the controller 110 returns to the above step 210. Besides, the controller 110 checks in step 212 whether or not the keyphone system requiring to set the automatic call mode corresponds to the keyphone system capable of embodying the automatic call. At this time, the above mentioned step 212 is checked by data indicating whether or not the keyphone system can embody the automatic call as shown in FIG. 4. When the data is set to "0", it can be seen that the keyphone system can not embody the automatic call. On the other hand, when the data is set to "1", it can be seen that the keyphone system can embody the automatic call. When checked in the above step 212 that the corresponding keyphone systems KTS0 to KTSn could embody the automatic call, the controller 110 proceeds to step 214 to thereby convert the state of the keyphone systems into the automatic call setting and releasing modes. To the contrary, when checked in the above step 212 that the corresponding keyphone systems could not embody the automatic call, the controller 110 proceeds to step 228, thereby converting the state of the keyphone systems into the standby mode. Meanwhile, the controller 110 senses in step 216 whether or not setting key data is inputted from the keyphone systems KTS0 to KTSn and in step 224 whether or not releasing key data is inputted from the keyphone systems KTS0 to KTSn. When sensed in the above step 216 that the setting key data was inputted, the controller 110 proceeds to step 218 in order to receive the extension number of the counterpart's keyphone systems to embody the automatic call from the keyphones KTS0 to KTSn. But, when sensed in the aforesaid step 216 that the setting key data was not inputted, the controller 110 proceeds to step 224. After the above-referenced step 218, the controller 110 proceeds to step 220, then to check whether or not the keyphone system corresponding to the received extension number can embody the automatic call through detection of the RAM 112 constructed as shown in FIG. 4. At this moment, when checked in the above step 220 that the counterpart's keyphone system could not embody the automatic call, the controller 110 proceeds to step 228, thereby performing corresponding function. However, when checked in the above step 220 that the keyphone systems KTS0 to KTSn could embody the automatic call, the controller 110 proceeds to step 222. Here, the controller 110 registers the extension number of the counterpart's keyphone system KTS received in the aforesaid step 218 and then, proceeds to step 228, so that the state of the keyphone system can be in the standby mode.

Besides, when sensed in the preceding step 224 that the releasing key data was inputted, the controller 110 proceeds to step 226. Therein, the controller 110 deletes the extension number of the counterpart's keyphone system registered in the RAM 112 and then, proceeds to the step 228.

Referring to FIG. 3, the controller 110 sets a counter value "k" to "0" to select the keyphone system in order in step 310. And, the controller 110 checks in step 312 whether or not the automatic call of a Kth keyphone system KTSk is connected. When checked in step 312 that the automatic calling of the Kth keyphone system KTSk was connected, the controller 110 also checks in steps 314, 316, and 318 the state of the keyphone system where the automatic call was connected. The controller 110 checks in step 314 whether or not the automatic call setting of the Kth keyphone system KTSk is released. The above mentioned step is determined depending upon whether or not the data is recorded in a number of the counterpart's keyphone system as shown in FIG. 4. Also, when checked in the step 314 that the automatic calling setting mode of the Kth keyphone system KTSk was not released, the controller 110 proceeds to the step 316. Here, the controller 110 checks whether or not the receiver of the Kth keyphone system KTSk is picked up or whether or not the incoming ring service exists. When checked in the step 316 that the receiver of the Kth keyphone system KTSk was not picked up or the incoming ring service did not exist, the controller 110 proceeds to the step 318. In step 318, the controller 110 checks whether or not the receiver of the counterpart's keyphone system KTS is picked up or whether or not the incoming ring service exists. When checked in the above step 314 that the automatic call setting of the Kth keyphone system KTSk was released or in the above steps 316 and 318 that the receiver of the Kth keyphone system KTSk or the counterpart's keyphone system or the incoming ring service existed, the controller 110 proceeds to step 320. Therein, the controller 110 cuts off the automatic call among the keyphone systems connected the automatic call through controlling the switching circuit 116. When checked in the above step 314 that the automatic call setting of the Kth keyphone system KTSk was not released, in the above step 316 that the receiver of the Kth keyphone system KTSk was not picked up or the incoming ring service did not exist and, in the above step 318 that the receiver of the counterpart's keyphone system was not picked up or the incoming ring service did not exist, or in the above step 320 that the automatic call is cut off, the controller 110 proceeds to step 330 in order to select next keyphone system KTSk+1.

Meanwhile, when checked in the aforesaid step 312 that the automatic call was not connected, the controller 110 proceeds to step 322 in order to check whether or not the Kth keyphone system KTSk can embody the automatic call. The above-mentioned step is also the same as described above. When checked in the foregoing step 322 that the Kth keyphone system KTSk could embody the automatic call, the controller 110 proceeds to step 324. Here, the controller 110 checks whether or not the Kth keyphone system KTSk is under the idle state not call state. When checked in the step 324 that the Kth keyphone system KTSk was under the idle state, the controller 110 proceeds to step 326 in order to check whether or not the counterpart's keyphone system KTS is also under the idle state. When checked in the above step 326 that the counterpart's keyphone system capable of embodying the automatic call was under the idle state, the controller 110 proceeds to step 328, then to connect the automatic call between the Kth keyphone system KTSk and the counterpart's keyphone system KTS by control of the switching circuit 116. But, when checked in the step 322 that the Kth keyphone system KTSk could not embody the automatic call or in the step 324 that the Kth keyphone system KTSk was not under the idle state, in the above step 326 that the counterpart's keyphone system was also not under the idle state, or in the above step 328 that the automatic call was connected between the Kth keyphone system KTSk and the counterpart's keyphone system, the controller 110 proceeds to step 330, thereby performing the corresponding operation as stated above. Following that, the controller 110 checks in step 332 whether or not services performance for all of the keyphone systems are completed. When checked in the step 332 that the services performance were not completed, the controller 110 returns to the above step 312. However, when checked in the step 332 that the services performance for all of the keyphones were completed, the controller 110 proceeds to step 334, thereby delaying a given time, about 50 ms. And then, the controller 110 returns to the above step 312.

As apparent from the foregoing, when the automatic call is set, users can connect call through driving speakers and mikes of two keyphone systems in the idle state. Besides, when one receiver of the two keyphone systems is picked up, or the incoming ring service did not exist, the automatic call can be cut off. Therefore, other subscriber can always call without interruption of other call in the on-live state where the automatic call is connected.

While there have been illustrated and described what are considered to be preferred embodiments of the present invention it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for embodying an automatic call in a keyphone system, comprising steps of:

inputting an extension number of a counterpart's keyphone capable of embodying the automatic call, and then registering said inputted extension number upon the existence of an automatic call setting request from a keyphone system capable of embodying the automatic call;

deleting said registered extension number of the counterpart's keyphone upon the existance of an automatic call releasing request from said keyphone system capable of embodying the automatic call;

cutting off said connected automatic call if the receiver of either of the two keyphones is picked up or if either of the two keyphones receives a ring; and connecting the automatic call upon said two keyphones being under an idle state in cutting off the automatic call of said two keyphones capable of embodying the automatic call.

2. The method according to claim 1, wherein said cutting off said connected automatic call and said connecting said automatic call are performed with a given period.

3. The method according to claim 1, wherein said cutting off of said connected automatic call further comprises the step of cutting off said connected automatic call if the receiver of said keyphone system is picked up deleting said registered extension number of the counterpart's keyphone.

4. The method according to claim 1, wherein said keyphone system performs a camp-on busy signal function.

5. A method for embodying an automatic call in a telephone system, comprising the steps of:

providing a telephone system having at least two telephones including a counterpart's telephone;

registering an extension number of said counterpart's telephone for automatic call mode;

connecting an automatic call only when both telephones are in an idle state;

terminating said automatic call mode when one receiver of either of said two telephones is picked up; and deleting said registered extension number of the counterpart's telephone when an automatic call mode releasing request occurs.

6. The method of claim 5, said step of registering an extension number of said counterpart's telephone for automatic call mode comprises:

inputting a mode setting key from said telephone system;

checking whether or not the telephone system requiring to set the automatic call mode corresponds to the telephone system capable of embodying the automatic call if said mode setting key is input;

converting the state of the telephone systems into the automatic call setting and releasing modes if it is determined that said telephone system requiring to set the automatic call mode corresponds to the telephone system capable of embodying the automatic call;

sensing that setting key data is inputted from the telephone systems;

receiving the extension number of the counterpart's telephone systems to embody the automatic call from the telephone system if said setting key is sensed;

determining if said telephone system can embody an automatic call;

if said telephone system can embody an automatic call, registering the extension number of said counterpart's telephone system; and converting state of said telephone systems into standby mode.

7. The method of claim 6, said step of deleting said registered extension number of the counterpart's telephone when an automatic call mode releasing request occurs comprises:

sensing whether the releasing key data was inputted if there is no sensing that said setting key data is inputted from the telephone system; and deleting the extension number of the counterpart's telephone system if said releasing key data was inputted.

8. The method of claim 6, wherein the step of converting the state of said telephone system into standby mode is executed if said telephone system is not capable of embodying an automatic call.

9. The method of claim 5, the step of connecting an automatic call only when both telephones are in an idle state further comprises:

setting a counter "k" to zero;

determining whether or not the automatic call of the kth telephone system is connected;

determining whether or not the kth telephone system can embody an automatic call if said automatic call of the kth telephone system is connected;

determining whether the kth telephone system is under an idle state if the kth telephone system can embody an automatic call, and incrementing said counter if the kth telephone system cannot embody an automatic call;

determining whether counterpart's telephone system is under an idle state if said kth telephone system is under an idle state, and incrementing said counter if said kth telephone is not under an idle state;

connecting the automatic call between the kth telephone system and the counterpart's telephone system of the counterpart's telephone system is under an idle state, and incrementing said counter of said counterpart's telephone is not under an idle state;

incrementing said counter if said automatic call is connected between said kth telephone system and the counterpart's telephone system;

determining whether all the services for all the telephone systems are completed; and delaying services for a given time if the services for all the telephone systems are completed and returning to the determination of whether the automatic call of the kth telephone system is connected if the services for all the telephone systems are not completed.

10. The method of claim 9, wherein said step of terminating said automatic call mode when one receiver of either of said two telephones is picked up further comprises:

releasing said automatic call mode of said kth telephone system if automatic call mode of the kth telephone system is connected;

checking whether the receiver of the kth telephone system is picked up or incoming ring service exists if said automatic call mode of said kth telephone system is not released and cutting off connected automatic call if said automatic call mode of said kth telephone system is released;

checking whether the receiver of the counterpart's telephone system is picked up or incoming ring service exists if said kth telephone system receiver is not picked up and an incoming ring service does not exist and cutting off connected automatic call if either said kth telephone system is picked up or incoming ring service exists; and incrementing said counter if receiver of counterpart's telephone system is not picked up and no incoming ring service exists and cutting off connected automatic call if said receiver of said counterpart's telephone system is picked up or if incoming ring service exists.

11. The method of claim 5, further comprising the step of:

terminating said automatic call mode when an incoming ring service exists in connection of said automatic call mode.

12. The method of claim 5, wherein said telephone system performs a camp-on busy signal function.

13. The method of claim 5, wherein said terminating said connected automatic call mode and said connecting said automatic call mode are performed within a given period of time.

14. A telephone system, comprising:

a plurality of telephone extensions;

a switching circuit for connecting said plurality of telephone extensions to an outside telephone line; and a controller for controlling the overall operation of the telephone system, including:

registering an extension number of said counterpart's telephone for automatic call mode;

connecting an automatic call only when both telephones are in an idle state;

terminating said automatic call mode when one receiver of either of said two telephones is picked up; and deleting said registered extension number of the counterpart's telephone when an automatic call mode releasing request occurs.

15. The telephone system of claim 14, further comprising a read only memory for storing extension numbers according to the performance of the exchange function.

16. The telephone system of claim 14, further comprising random access memory to store an operational program automatically regulating functional operation of the controller.

17. The telephone system of claim 14, further comprising a ring generator transmitting an audio ring when a request for a call arises.

18. The telephone system of claim 14, further comprising said controller automatically terminating said automatic call mode when an incoming ring service exists in connection of said automatic call mode.

19. The telephone system of claim 14, wherein said telephone system performs a camp-on busy signal function.

20. The telephone system of claim 14, wherein said terminating said connected automatic call mode and said connecting said automatic call mode are performed within a given period of time.

* * * * *